United States Patent
Lyle, Jr.

(10) Patent No.: US 7,835,164 B2
(45) Date of Patent: Nov. 16, 2010

(54) APPARATUS AND METHOD OF EMPLOYING COMBINED SWITCHING AND PWM DIMMING SIGNALS TO CONTROL BRIGHTNESS OF COLD CATHODE FLUORESCENT LAMPS USED TO BACKLIGHT LIQUID CRYSTAL DISPLAYS

(75) Inventor: Robert L. Lyle, Jr., Raleigh, NC (US)

(73) Assignee: Intersil Americas Inc., Milpitas, CA (US)

(*) Notice: Subject to any disclaimer, the term of this patent is extended or adjusted under 35 U.S.C. 154(b) by 434 days.

(21) Appl. No.: 10/927,755

(22) Filed: Aug. 27, 2004

(65) Prior Publication Data

US 2005/0243580 A1   Nov. 3, 2005

Related U.S. Application Data

(60) Provisional application No. 60/565,930, filed on Apr. 28, 2004.

(51) Int. Cl.
*H02M 3/335* (2006.01)
*H02M 5/42* (2006.01)

(52) U.S. Cl. .............................. 363/24; 363/16; 363/25; 363/95; 363/97

(58) Field of Classification Search .................. 363/16, 363/24, 25, 95, 97
See application file for complete search history.

(56) References Cited

U.S. PATENT DOCUMENTS

| 4,975,820 | A  | * | 12/1990 | Szepesi | 363/21.17 |
| 6,181,092 | B1 | * | 1/2001 | Turner | 318/400.32 |
| 6,967,852 | B2 | * | 11/2005 | Hamilton | 363/24 |
| 2004/0233663 | A1 | * | 11/2004 | Emslie et al. | 362/221 |

* cited by examiner

*Primary Examiner*—Edward Tso
*Assistant Examiner*—Johali A Torres Ruiz
(74) *Attorney, Agent, or Firm*—Fogg & Powers LLC

(57) ABSTRACT

An AC power supply system modulates a high frequency switching signal with a pulse width modulation (PWM) signal to produce a composite signal. The duty cycle of the PWM component of the composite signal is used to control the brightness of a cold cathode fluorescent lamp for backlighting a liquid crystal display.

18 Claims, 2 Drawing Sheets

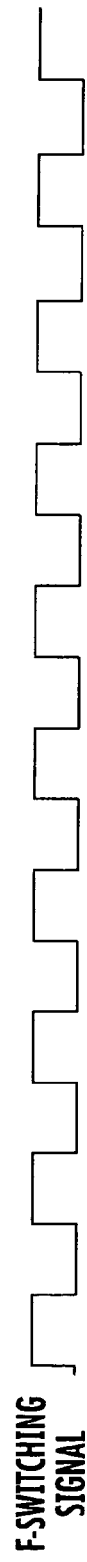

APPARATUS AND METHOD OF EMPLOYING COMBINED SWITCHING AND PWM DIMMING SIGNALS TO CONTROL BRIGHTNESS OF COLD CATHODE FLUORESCENT LAMPS USED TO BACKLIGHT LIQUID CRYSTAL DISPLAYS

CROSS-REFERENCE TO RELATED APPLICATION

The present application claims the benefit of U.S. Application Ser. No. 60/565,930, filed Apr. 28, 2004, entitled: "Combined Signal for Switching Frequency, PWM Dimming and Analog Dimming for LCD Backlight", assigned to the assignee of the present application, and the disclosure of which is incorporated herein.

FIELD OF THE INVENTION

The present invention relates in general to power supply systems and subsystems thereof, and is particularly directed to a method and apparatus for combining a pulse width modulation (PWM) signal and a high frequency switching signal to control AC power being supplied to a high voltage device, such as a cold cathode fluorescent lamp of the type employed for backlighting a liquid crystal display, with the duty cycle of the pulse width modulation signal being effective to controllably dim (control the brightness of) the lamp.

BACKGROUND OF THE INVENTION

There are a variety of electrical systems, which require one or more sources of high voltage AC power for controlling the operation of a system application device. As a non-limiting example, a liquid crystal display (LCD), such as that employed in desktop and laptop computers, or in larger display applications such as large-scale television screens, requires an associated set of high AC voltage-driven cold cathode fluorescent lamps (CCFLs) mounted directly behind it for backlighting purposes. Indeed, large LCD panels require relatively large numbers (e.g., on the order of ten to forty) of such lamps for uniform backlighting.

In order to achieve uniform brightness of all the lamps, several inverters (voltage-controlled switching devices and associated output transformers coupled to the lamps) are required, with each inverter generating a high voltage sine wave that typically drives from one to five parallel-connected lamps. In such an architecture, the switching frequencies of all the inverters must be mutually synchronized, in order to avoid uncontrolled electromagnetic interference at sum and difference frequency values of the various switching frequencies. This is customarily accomplished by distributing a synchronizing signal among the inverters to set the switching frequency.

Adjusting the brightness of (or dimming) a CCFL may be effected by means of a PWM dimming signal, which controllably switches the lamp drive voltage and current off for brief periods of time. In accordance with this technique, the CCFL is turned ON and OFF for relatively short periods of time (e.g., from 0.1 to 5 msec. each), with the brightness of the lamp being proportional to the PWM duty cycle. This methodology is customarily carried out by applying a separate PWM dimming signal to each inverter. In addition to PWM dimming, analog dimming may be used to increase the range of dimming provided by PWM dimming. In a typical application, an analog control signal is supplied to each inverter in order to set the current flowing through the lamp. The brightness of the lamp output is adjusted by controllably increasing or decreasing the amplitude of the analog signal.

SUMMARY OF THE INVENTION

In accordance with the present invention, complexities of conventional CCFL dimming control methodologies, including those discussed above, are effectively reduced by a new and improved CCFL brightness control apparatus and method that combines or amplitude modulates a high frequency switching signal (e.g., on the order of 50 KHz) used to energize the lamp, with a low frequency (on the order of 200 Hz) pulse width modulation dimming signal, to produce a composite signal for controllably dimming the output of the lamp. Forming such a composite signal effectively provides a three-to-one reduction in the number of wires carrying the switching frequency, PWM dimming and analog dimming from a central controller to one or more 'satellite' power stages. An AND gate, through which the composite signal is realized, is physically located at the central controller, whereas the remainder of the circuitry of the CCFL brightness control apparatus is located at positions corresponding to respective 'satellite' power stages. The composite signal is coupled to a rising edge detector, which is operative to set a first flip-flop, in response to a low-to-high transition in the composite signal, and to a falling edge detector, which sets a second flip-flop, in response to a high-to-low transition in the composite signal. The first flip-flop is coupled via a first driver to the gate input of a first MOSFET switch, and the second flip-flop is coupled via a second driver to the gate input of a second MOSFET switch.

The first MOSFET switch has its source-drain current flow path coupled between a first end of a primary winding of a step-up transformer and a first MOSFET current sensing resistor referenced to ground. The transformer's primary winding has its center tap coupled to a prescribed DC power supply voltage. The second MOSFET switch has its source-drain current flow path coupled between a second end of the transformer's primary winding and a second MOSFET current sensing resistor referenced to ground. These two resistors produce first and second voltages that are respectively proportional to the currents in the source-drain paths of first and second MOSFET switches. The first and second MOSFET current-representative voltages are coupled to first inputs of first and second comparators, respectively, second inputs of which are coupled to receive a threshold voltage from an error amplifier.

The threshold voltage produced by the error amplifier is the difference between a lamp current-representative voltage developed across a lamp current sense resistor coupled to the secondary winding of the transformer, and an analog dimming control voltage produced by a low pass filter connected to the composite signal. The low pass filter is coupled to receive the composite signal, so that the output of the low pass filter is a DC voltage proportional to the duty cycle of the PWM brightness control signal component within the composite signal.

The composite signal may be produced by an AND gate whose inputs are the continuous Fsw signal (50 KHz) and the PWM dimming signal (200 Hz). During the low portion of each successive period of the PWM dimming signal, the composite signal is held low and does not SET the first and second flip-flops, the flip-flop's Q output does not go high, the MOSFETs do not turn on, and therefore there is no generation of a lamp energizing waveform in the secondary winding of the transformer. On the other hand, during the high portion of each period of the PWM dimming signal, the composite signal switches high and low at Fsw, the positive and negative edges set the flip-flops, turning on the MOSFETs and generate the waveform on the secondary that energizes the lamp.

In response to a low-to-high transition (rising edge) in the composite signal, the rising edge detector sets the first flip-flop, causing its Q output to go high. This turns ON the first MOSFET switch, so as to cause a current to flow (from VCC) through the primary winding of the transformer and the first resistor to ground. This produces a stepped-up voltage in the transformer's secondary winding, which is coupled to the CCFL, causing a current to flow through the secondary winding and the lamp current sense resistor, the voltage across which is used to establish the threshold voltage produced by the error amplifier. Shortly thereafter, the voltage across the first resistor reaches the threshold voltage supplied the error amplifier, so as to reset the first flip-flop, turning OFF the first MOSFET, so as to terminate the flow of current in the transformer's primary.

For a relatively high duty cycle of the PWM dimming signal, representative of a relatively high brightness level, the DC threshold reference voltage produced by the error amplifier will be relatively large, so that the output of the first comparator will change state and the first flip-flop will be reset at a relatively later time. This means the duration of the ON time of the first MOSFET will be relatively long. On the other hand, for a lower brightness level, corresponding to a lower duty cycle of the PWM dimming signal, the threshold voltage produced by the error amplifier will be smaller, so that the output of the first comparator will change state and the first flip-flop will be reset earlier than in the case of a relatively high duty cycle of the PWM dimming signal. This means that the first MOSFET will be switched off relatively early.

In a complementary manner, during the time that the low frequency dimming PWM signal is high, each high-to-low transition (falling edge) of the 50 KHz signal will cause the falling edge detector to set the second flip-flop, so as to turn the second MOSFET switch ON, and cause a current to flow from VCC through the transformer's primary winding and through the second resistor to ground. This induces a stepped-up voltage in the transformer's secondary winding, which is applied to the CCFL. Shortly thereafter, the voltage across the second resistor reaches the threshold voltage supplied by the error amplifier, so as to reset the second flip-flop, turning off the second MOSFET, and interrupting the flow of current in the transformer's primary winding.

As in the case of a low-to-high transition in the 50 KHz signal, for a relatively high duty cycle of the PWM dimming signal, representative of a relatively high brightness level, the DC threshold reference voltage produced by the error amplifier will be relatively large, so that the output of the second comparator will change state and the second flip-flop will be reset at a relatively later time. This means the duration of the ON time of the second MOSFET will be relatively long. In contrast, for a lower brightness level, corresponding to a lower duty cycle of the PWM dimming signal, the threshold voltage produced by the error amplifier will be smaller, so that the output of the second comparator will change state and the second flip-flop will be reset earlier than in the case of a relatively high duty cycle of the PWM dimming signal. As a consequence, the second MOSFET will be switched off relatively early.

BRIEF DESCRIPTION OF THE DRAWINGS

FIGS. 2-5 are timing diagrams associated with the operation of the CCFL dimming control architecture of FIG. 1.

DETAILED DESCRIPTION

Figure 1:
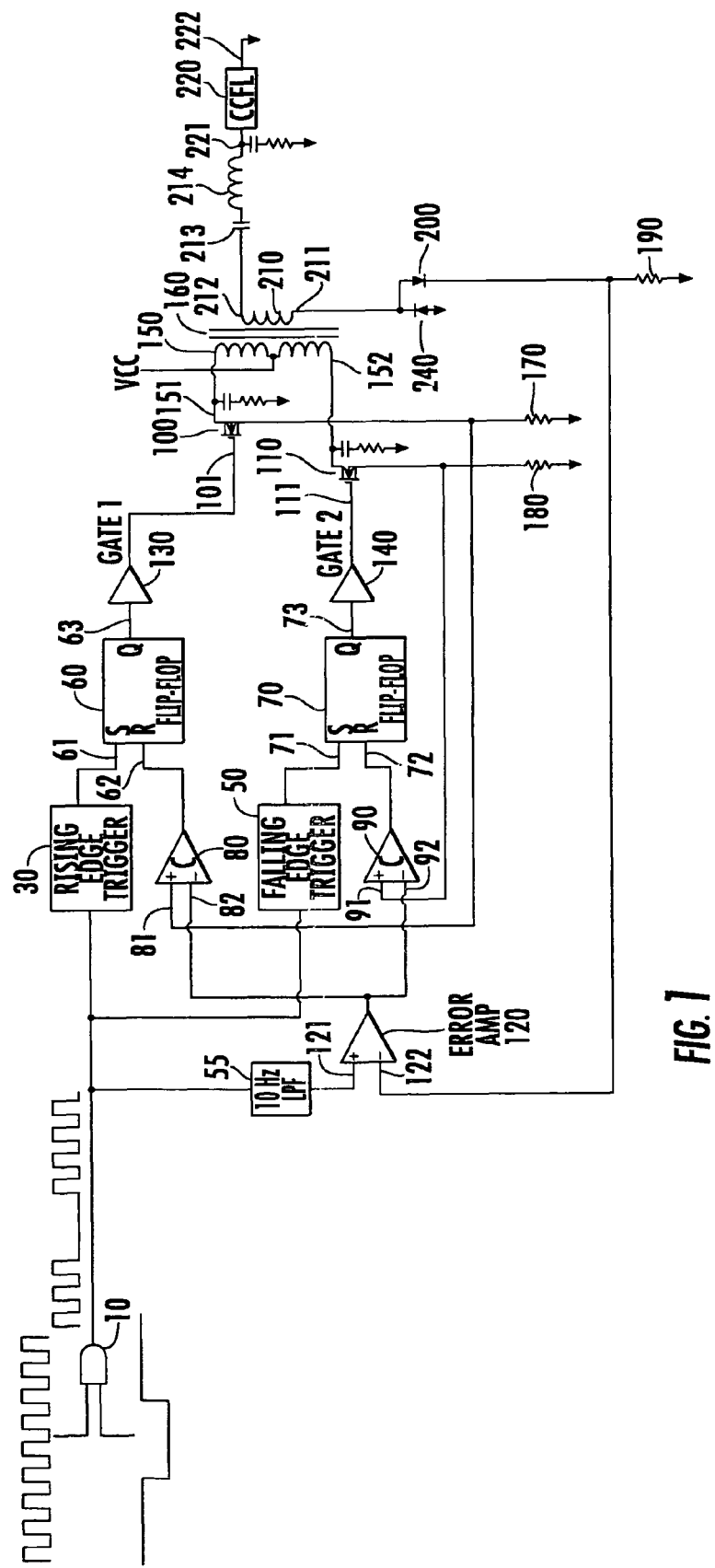
FIG. 1 is a diagrammatic illustration of a CCFL energization and dimming architecture that combines a high frequency switching signal and a PWM signal into a composite control signal that is effective to control the brightness of a cold cathode fluorescent lamp in accordance with the invention.

Before detailing the single control input-based CCFL brightness control architecture of the present invention, it should be observed that the invention resides primarily in a prescribed novel arrangement of conventional controlled power supply and digital switching circuits and components therefor. Consequently, the configuration of such circuits and components and the manner in which they may be interfaced with a powered utility device, such as a cold cathode fluorescent lamp, have, for the most part, been depicted in FIG. 1 of the drawings by a readily understandable schematic-block diagram, which shows only those specific features that are pertinent to the present invention, so as not to obscure the disclosure with details which will be readily apparent to those skilled in the art having the benefit of the description herein. Thus, the diagram illustration of FIG. 1 is primarily intended to show the major components of the invention in a convenient functional grouping, whereby the present invention may be more readily understood.

Attention is now directed to FIG. 1, which is a schematic-block diagram of the general architecture of a DC-AC power supply architecture for powering and controllably adjusting the output brightness of a cold cathode fluorescent lamp, in accordance with a preferred embodiment of the present invention. As shown therein, the CCFL drive and brightness control system of the invention comprises a first input port 11, to which a high frequency, lamp-energizing switching signal is applied, and a second input port 12, to which a relatively low frequency periodic PWM dimming or brightness control signal (e.g., one having a frequency on the order of 200 Hz) is applied.

As described briefly above, pursuant to the invention, this PWM brightness control signal serves two functions. First, by modulating the high frequency, lamp-energizing switching signal used to energize the lamp, the duty cycle of the low frequency PWM dimming signal serves to control the percentage of time that the plasma in the lamp is being energized, so as to set the brightness of the lamp relative to a prescribed range of brightness variation.

As illustrated in the timing diagram of FIG. 2, the high frequency, lamp-energizing, switching signal is a periodic signal, and may comprise a square wave signal supplied by an associated oscillator (not shown), having a relatively high frequency (e.g., on the order of 50 KHz) for sustaining ignition of a plasma in a CCFL. The relatively low frequency PWM brightness control signal is shown in the timing diagram of FIG. 3 as a binary level switching signal. In particular, FIG. 3 shows the PWM signal transitioning between a first (or high) level 31 and a second (or low) level 32. The PWM signal has a frequency (e.g., on the order to 200 Hz) that is considerably lower than the relatively high frequency (50 KHz) of the lamp energizing switching signal. The length of time that the (200 Hz) PWM dimming signal is asserted high is associated with the duty cycle of the PWM dimming signal. For a relatively high duty cycle (e.g., 0% dimming, associated with 100% or full CCFL brightness), the PWM dimming signal would be continuously at the high level 31, while for a relatively low duty cycle (e.g., on the order of 5% brightness), the PWM dimming signal is at high level 31 for 5% of the time and is at low level 32 for 95% of the time.

As shown in FIG. 1, ports 11 and 12 are coupled to an AND gate 10, which logically combines ('ANDs') the high frequency (50 KHz) clock signal with the relatively low frequency (200 Hz) PWM signal, to realize a composite brightness control signal, shown as the signal 40 in the timing diagram of FIG. 4. In particular, the composite signal 40 has a first, high frequency (50 KHz) square wave portion 41 that effectively corresponds to the 50 KHz waveform of FIG. 3, and a second, low frequency portion 42 that effectively corresponds to the low level of the (200 Hz) PWM dimming signal. In effect, AND gate 10 serves to amplitude modulate the relatively low frequency PWM dimming signal of FIG. 3 onto the high frequency square wave of FIG. 2. Forming such a composite signal effectively provides a three-to-one reduction in the number of wires carrying the switching frequency, PWM dimming and analog dimming from a central controller to one or more 'satellite' power stages. AND gate 10, through which the composite signal is realized, is physically located at the central controller, whereas the remainder of the circuitry of the CCFL brightness control apparatus of FIG. 1 is located at positions corresponding to respective 'satellite' power stages.

The output of AND gate 10 is coupled to a rising edge detector 30, a falling edge detector 50, and a very low frequency low pass filter 55 (e.g., a low pass filter having a cut-off frequency on the order of 10 Hz). The rising edge detector 30 asserts an output signal, that is coupled to the set (S) input 61 of a set-reset flip-flop 60, in response to a low-to-high transition in the composite signal output of AND gate 10. In a complementary manner, falling edge detector 50 asserts an output signal, that is coupled to the set (S) input 71 of a set-reset flip-flop 70, in response to a high-to-low transition in the composite signal output of AND gate 10. Low pass filter 55 is used to generate a DC voltage that is proportional to the duty cycle of the PWM brightness control or dimming PWM signal component within the composite signal at the output of AND gate 10. As will be described below, an error amplifier 120 differentially combines this DC voltage with a voltage representative of lamp current to provide a threshold voltage that controls the resetting of flip-flops 60 and 70.

For this purpose, flip-flop 60 has its reset (R) input 62 coupled to the output of an upper MOSFET current comparator 80, while flip-flop 70 has its reset (R) input 72 coupled to the output of a lower MOSFET current comparator 90. Comparators 80 and 90 compare voltages representative of currents flowing in the source-drain paths of respective MOSFET switches 100 and 110 (which are switched ON and OFF in a push-pull manner by the 50 KHz switching signal) with a threshold voltage supplied by error amplifier 120. This threshold voltage is the difference between a voltage representative of lamp current, as supplied by a resistor 190 (referenced to ground) coupled to the secondary path of a step-up transformer 160, and a DC voltage produced by low pass filter, the DC voltage being proportional to the duty cycle in the brightness level component of the composite signal.

As long as voltages representative of the source-drain currents of the MOSFETs 100 and 110 are less than the threshold voltage provided by error amplifier 120, the outputs of the comparators 80 and 90 remain low, and flip-flops 80 and 90 are unaffected. However, in response to a voltage representative of a MOSFET's source-drain current exceeding the threshold voltage, the output of its associated comparator will go high, causing the flip-flop to which the comparator is coupled to be reset. As described below, resetting a flip-flop serves to turn OFF its associated MOSFET switch.

To this end, the Q output 63 of flip-flop 60 is coupled via a driver 130 to the gate input 101 of upper MOSFET switch 100, while flip-flop 70 has its Q output 73 coupled via a driver 140 to the gate input 111 of lower MOSFET switch 110. Upper MOSFET switch 100 has its source-drain current flow path coupled between a first end 151 of a primary winding 150 of step-up transformer 160 and a resistor 170 referenced to ground. The transformer's primary winding 150 has its center tap coupled to a prescribed DC power supply voltage (e.g., VCC). The lower MOSFET switch 110 has its source-drain current flow path coupled between a second end 152 of the primary winding 150 of the transformer 160 and a resistor 180 referenced to ground. Resistors 170 and 180 are employed to develop respective voltages that are proportional to the currents in the source-drain paths of MOSFET switches 100 and 110 to which opposite ends of the transformer's primary winding 150 are coupled. These MOSFET-current representative voltages are respectively coupled to the non-inverting (+) inputs 81 and 91 of comparators 80 and 90, whose inverting (−) inputs 82 and 92 are coupled to the output of error amplifier 120.

Error amplifier 120 has its non-inverting (+) input 121 coupled to the output of low-pass filter 55, and its inverting (−) input 122 coupled to the common connection of resistor 190 and an output current rectifying diode 200, which is coupled to a first end 211 of the secondary winding 210 of transformer 160. Similar to resistors 170 and 180, resistor 190 is used to develop a voltage proportional to the rectified lamp current in the secondary winding 150 of transformer 160. A second end 212 of secondary transformer winding 210 is coupled through a capacitor 213 and an inductor 214 to a near end terminal 221 of a cold cathode fluorescent lamp 220, a far end terminal 222 of which is grounded. An output capacitor 230, which is referenced to ground, is coupled to the near end terminal 221 of CCFL 220. An LC tank circuit (tuned to the frequency (50 KHz) of the high frequency switching signal) is formed by the inductance of the transformer and the capacitance of associated coupling and output capacitors. This tank circuit serves to effectively convert the high frequency square wave outputs of the MOSFET switches 100 and 110 into a sine wave having very substantially suppressed harmonic components. Diode 200 has its cathode coupled to resistor 190 and its anode coupled to the first end 211 of the transformer secondary winding 210, which is further coupled to the cathode of a diode 240, whose anode is grounded.

The operation of the CCFL brightness control architecture of the invention is as follows. As pointed out above, the PWM dimming signal is a relatively low frequency, periodic signal (e.g., on the order of 200 Hz), the duty cycle of which are used to establish the brightness of the lamp. For typical present day CCFLs, as long as these parameters result in the PWM dimming signal being high for a time interval of at least 0.3 milliseconds to 0.5 milliseconds, and low for no more than a time interval of four to five milliseconds, the ON/OFF modulated 50 KHz signal will maintain ignition of a plasma within the lamp.

During that portion of one period of the PWM dimming signal, where the PWM signal is low, the 50 KHz signal is prevented from being coupled through AND gate 10 to the drive circuitry for energizing the CCFL, so that there is no ON/OFF switching of the respective upper and lower MOSFETs 100 and 110. As noted above, it is only during the time that the low frequency PWM dimming signal, which is applied to the second input 12 of AND gate 10, is high, that there is any ON/OFF switching of the MOSFETS.

When the low frequency dimming PWM signal applied to the second input 12 of AND gate 10 is high, the output of AND gate 10 effectively replicates the (50 KHz) high frequency signal applied to AND gate input 11. Each low-to-high transition in this signal is detected by rising edge detector 30 which, in turn, triggers the set (S) input of flip-flop 60, causing its Q output 63 to go high. When the Q output 63 of flip-flop 60 goes high, the upper MOSFET switch 100 is gated ON, which causes a current to flow from VCC through primary winding 150 of transformer 160 to ground through current sense resistor 170. This, in turn, induces a stepped-up voltage in the transformer's secondary winding 210, which is coupled to the CCFL 220.

Shortly thereafter the voltage across the current sense resistor 170, which is applied to non-inverting (+) input 81 of comparator 80, will reach the threshold voltage supplied to the comparator's inverting input 82 by error amplifier 120. As pointed out above, error amplifier 120 generates a voltage that is representative of the difference between the lamp current-representative voltage across the lamp current sense resistor 190 and a DC brightness level or PWM dimming control voltage produced by low pass filter 55, that is proportional to the duty cycle of the PWM brightness control signal component within the composite signal at the output of AND gate 10.

Therefore, for a relatively high brightness level, associated with a relatively high duty cycle of the PWM dimming signal, the larger will be the DC threshold reference voltage at the output of error amplifier 120, so that the output of comparator 80 will change state and flip-flop 60 will be reset at a relatively later time. This means the duration of the ON time of MOSFET 100 will be relatively long, as shown by transition 43-L in the timing diagram of FIG. 4.

In contrast, for a lower brightness level, corresponding to a lower duty cycle of the PWM dimming signal, the smaller will be the output of error amplifier 120, so that the output of comparator 80 will change state and flip-flop 60 will be reset earlier than in the case of a relatively high duty cycle of the PWM dimming signal. This means that MOSFET 100 will be switched off relatively early, as shown by high-to-low transition 43-E in the timing diagram of FIG. 4.

In a complementary manner, during the time that the low frequency dimming PWM signal applied to AND gate 10 is high, each high-to-low transition in the (50 KHz) high frequency signal causes falling edge detector 50 to trigger the set (S) input of flip-flop 70, so that its Q output 73 goes high. When the Q output 73 of flip-flop 70 goes high, the lower MOSFET switch 110 is gated ON, which causes a current to flow from VCC through the primary winding 150 of transformer 160 to ground through current sense resistor 180 which, in turn, induces a stepped-up voltage in the transformer's secondary winding 210, which is coupled to CCFL 220.

Similar the sense resistor 170, the voltage across current sense resistor 180, which is applied to non-inverting (+) input 91 of comparator 90, will eventually reach the (threshold) voltage supplied by error amplifier 120 to the inverting (−) input 92 of comparator 90. As pointed out above, the higher the brightness level, corresponding to a longer duty cycle of the PWM dimming signal, the larger will be the reset threshold reference voltage at the output of error amplifier 120, so that the output of comparator 90 will change state and flip-flop 70 will be reset relatively late. This means that MOSFET 110 will be switched off relatively late, as shown at 44-L in the timing diagram of FIG. 4. In contrast, the lower the brightness level signal, corresponding to a lower duty cycle of the PWM dimming signal, the smaller will be the output of error amplifier 120, so that the output of comparator 90 will change state and flip-flop 70 will be reset relatively early. This means that MOSFET 110 will be switched off relatively early, as shown by high-to-low transition 44-E in the timing diagram of FIG. 4.

The sine wave current in the lamp that is produced from the rectangular gate drive waveforms by the low pass filter formed by the inductor and capacitor at node 221 in FIG. 1. The rectangular waveform has a spectrum comprised of a fundamental at the switching frequency (Fsw) and harmonics at odd multiples of the Fsw (i.e., 3*Fsw, 5*Fsw, etc). The low pass filter at node 221 passes the fundamental and attenuates signals at frequencies above the fundamental. Harmonic signals that do pass the filter appear as very small ripple on the large sine wave. The amplitude of the spectrum at the fundamental is proportional to the 'on time' of the FETs. As a result the amplitude of the sine wave at node 221 is controlled by the 'on time' of the FETs.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art. For example, although the inverter switches are shown as MOSFET devices, it is to be understood that other equivalent circuit components, such as bipolar transistors, IGFETs, or other voltage controlled switching devices, may be used. Moreover although push-pull inverter switching circuitry is shown, other configurations, such as, but not limited to half-bridge and full-bridge topologies, may be employed.

What is claimed:

1. An apparatus for supplying AC power to a high voltage device comprising:
    a first input port adapted to be coupled to a high frequency switching signal;
    a second input port adapted to be coupled to a low frequency pulse width modulation signal;
    a combining circuit, which is operative to combine, said high frequency switching signal with said low frequency pulse width modulation signal, to produce a composite signal;
    a first switching circuit coupled to a first portion of a primary winding of a transformer, said transformer having a secondary winding coupled to said high voltage device, said first switching circuit being operative to controllably switch a first current through said primary winding in accordance with first transitions in said composite signal;
    a second switching circuit coupled to a second portion of said primary winding of said transformer, said second switching circuit being operative to controllably switch a second current through said primary winding in accordance with second transitions in said composite signal; and
    wherein said first switching circuit is operative to controllably interrupt said first current, in accordance with a prescribed relationship between a first voltage, representative of said first current, and a second voltage representative of a difference between a third voltage representative of current through said secondary winding and a fourth voltage representative of a DC component of said low frequency pulse width modulation signal.

2. The apparatus according to claim 1, wherein said second switching circuit is operative to controllably interrupt said second current, in accordance with a prescribed relationship between a fifth voltage, representative of said second current, and said second voltage.

3. The apparatus according to claim 1, wherein said combining circuit is operative to amplitude modulate said high frequency switching signal by said frequency pulse width modulation signal, to produce said composite signal.

4. The apparatus according to claim 1, wherein said first switching circuit includes a rising edge detector, which is operative to detect a rising edge of said composite signal, said rising edge detector having an output operative to set a first flip-flop having an output thereof driving a control input of a first switching device coupled to said first portion of said primary winding of said transformer, and wherein said second switching circuit comprises a falling edge detector, which is operative to detect a falling edge of said composite signal, said falling edge detector having an output operative to set a second flip-flop having an output driving a control input of a second switching device coupled to said second portion of said primary winding of said transformer.

5. The apparatus according to claim 1, wherein said first switching circuit comprises a low pass filter, which is coupled to the output of said combining circuit, and is operative to produce said fourth voltage in proportion to the DC component of said low frequency pulse width modulation signal.

6. The apparatus according to claim 5, wherein said first switching circuit includes an error amplifier, which is operative to generate said second voltage in accordance with said difference between said third voltage and said fourth voltage.

7. The apparatus according to claim 6, wherein said first switching circuit further comprises a first comparator which is operative to interrupt said first current, in accordance with whether or not said first voltage exceeds said second voltage.

8. The apparatus according to claim 7, wherein said second switching circuit is operative to controllably interrupt said second current, in accordance with a prescribed relationship between a fifth voltage, representative of said second current, and said second voltage.

9. The apparatus according to claim 8, wherein said second switching circuit comprises a second comparator, which is operative to controllably interrupt said second current in accordance with whether or not said fifth voltage exceeds said second voltage.

10. The apparatus according to claim 1, wherein said high voltage device comprises a cold cathode fluorescent lamp of the type used to backlight a liquid crystal display.

11. A method of supplying AC power to a high voltage device comprising the steps of:
    (a) combining a high frequency switching signal with a low frequency pulse width modulation signal to produce a composite signal;
    (b) controllably switching a first current through a primary winding of a transformer, having a secondary winding coupled to said high voltage device, in accordance with first transitions in said composite signal;
    (c) controllably switching a second current through said primary winding in accordance with second transitions in said composite signal; and
    wherein step (b) comprises controllably interrupting said first current, in accordance with a prescribed relationship between a first voltage, representative of said first current, and a second voltage representative of a difference between a third voltage representative of current through said secondary winding and a fourth voltage representative of a DC component of said low frequency pulse width modulation signal.

12. The method according to claim 11, wherein step (c) comprises controllably interrupting said second current, in accordance with a prescribed relationship between a fifth voltage, representative of said second current, and said second voltage.

13. The method according to claim 11, wherein step (a) comprises amplitude modulating said high frequency switching signal in accordance with said frequency pulse width modulation signal, to produce said composite signal.

14. The method according to claim 11, wherein step (b) comprises detecting a rising edge of said composite signal and, in response thereto, setting a first flip-flop having an output thereof driving a control input of a first switching device coupled to said first portion of said primary winding of said transformer, and wherein step (c) comprises detecting a falling edge of said composite signal and, in response thereto, setting a second flip-flop having an output driving a control input of a second switching device coupled to said second portion of said primary winding of said transformer.

15. The method according to claim 14, wherein step (b) comprises generating said fourth voltage in proportion to the DC component of said low frequency pulse width modulation signal.

16. The method according to claim 15, wherein step (c) comprises controllably interrupting said second current, in accordance with a prescribed relationship between a fifth voltage, representative of said second current, and said second voltage.

17. The method according to claim 11, wherein said high voltage device comprises a cold cathode fluorescent lamp of the type used to backlight a liquid crystal display.

18. An apparatus for supplying AC power to a high voltage device comprising:
    a first input port adapted to be coupled to a high frequency switching signal;
    a second input port adapted to be coupled to a low frequency pulse width modulation signal;
    a combining circuit, which is operative to combine, said high frequency switching signal with said low frequency pulse width modulation signal, to produce a composite signal;
    a first switching circuit coupled to a first portion of a primary winding of a transformer, said transformer having a secondary winding coupled to said high voltage device, said first switching circuit being operative to controllably switch a first current through said primary winding in accordance with first transitions in said composite signal;
    a second switching circuit coupled to a second portion of said primary winding of said transformer, said second switching circuit being operative to controllably switch a second current through said primary winding in accordance with second transitions in said composite signal; and
    wherein said first switching circuit is operative to controllably interrupt said first current, in accordance with a level of said first current, a level of current through said secondary winding and said low frequency pulse width modulation signal.

* * * * *